June 2, 1970 S. H. CAMERON 3,516,067

MULTISTATION GRAPHICAL TERMINAL SYSTEM

Filed Oct. 26, 1966 2 Sheets-Sheet 1

INVENTOR.

Scott H. Cameron

BY Hill, Sherman, Meroni, Gross & Simpson ATTORNEYS

June 2, 1970 S. H. CAMERON 3,516,067

MULTISTATION GRAPHICAL TERMINAL SYSTEM

Filed Oct. 26, 1966 2 Sheets-Sheet 2

INVENTOR.

Scott H. Cameron

BY Hill, Sherman, Meroni, Gross & Simpson ATTORNEYS

United States Patent Office 3,516,067
Patented June 2, 1970

3,516,067
MULTISTATION GRAPHICAL TERMINAL SYSTEM
Scott H. Cameron, Northfield, Ill., assignor to IIT Research Institute, Chicago, Ill., a corporation of Illinois
Continuation-in-part of application Ser. No. 562,646, July 5, 1966. This application Oct. 26, 1966, Ser. No. 589,589
Int. Cl. G06f *3/04, 3/14*
U.S. Cl. 340—172.5 12 Claims

ABSTRACT OF THE DISCLOSURE

The disclosure shows a multistation terminal system comprising a plurality of graphical input stations for shared communication with a digital computer. In the specific embodiment shown each graphical input device comprises a hand held stylus coupled through flexible cables to potentiometers or digital shaft encoders. Square law cam configurations may be utilized in the coupling so that the output is a linear function of stylus position. The instantaneous stylus position is shown as an intensified spot on a display raster. A magnetic disk memory carries unitary weighted display signals for the pictorial display units so that the displays are refreshed independently of the computer. The computer updates the magnetic disk by transmitting groups of unitary weighted display signals, for example 16-bit words. The display signals and element rate clock signals are recorded on the disk as square waves which change in polarity of saturation to represent one binary value (or to indicate a clock pulse position) but do not change polarity to represent the other binary value. A single magnetic head may serve to refresh two displays with minimum disturbance during the time when the head receives updating signals from the computer. Preferably, the display units are conventional low cost broadcast television receivers.

The present application is a continuation-in-part of my copending application Ser. No. 562,646 filed July 5, 1966.

This invention relates to computer assisted graphical systems wherein a pictorial display is developed by the interaction of a human operator and the computer. The invention relates particularly to a manually operated graphical input device for registering manually selected points, to circuitry for visually indicating the instantaneous position of a manually operated pointer with respect to a display region, and to a multistation terminal system which serves to maintain visual displays at each station of the system.

There is a widely recognized need for a graphical input terminal system which will enable a plurality of users at remote points to construct graphical displays in cooperation with a central computer processor. It has already been recognized that such graphical systems when economically feasible will find widespread use in the design of products of all types, in scientific investigations and in the development of scientific theories, and in various educational endeavors.

It is therefore an object of the present invention to provide a multiple graphical input terminal system of economical construction.

Another object is to provide a versatile multistation graphical terminal system providing for effective shared communication with a central computer processor while maintaining graphical displays at the respective stations thereof independently of the central computer.

A further object of the invention is to provide a graphical input terminal system capable of utilizing commercially available relatively low cost television display units and extremely simple and economical graphical input devices.

Still another object is to provide an improved graphical input device for transmitting signals in accordance with the location of a manually positioned input element. A related object is to provide such a graphical input device which while providing adequate accuracy is of unique simplicity and of very low cost.

In accordance with a preferred embodiment of the invention a plurality of low cost raster type television display units are essentially continuously refreshed in accordance with partially manually defined pictorial information stored in a local magnetic disk memory, the display information in the memory being in the form of light intensity control signals which are read out from the memory at the rate and in the sequence corresponding to the scanning of the television display rasters.

Other objects, features and advantages of the present invention will be apparent from the following detailed description taken in connection with the accompanying drawings, in which.

AS SHOWN ON THE DRAWINGS

Figure 1:
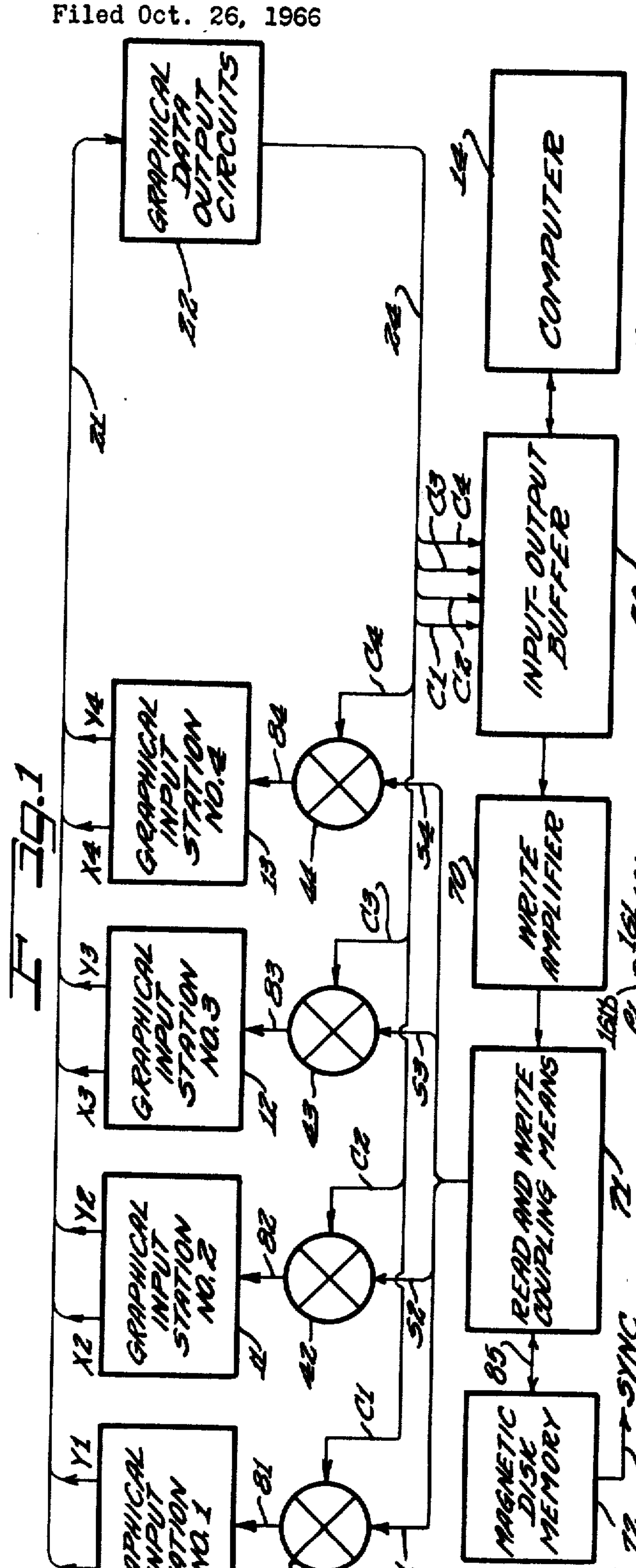
FIG. 1 is a block diagram of a preferred form of a multistation graphical input terminal system in accordance with the present invention.

Referring to FIG. 1, the reference numerals 10, 11, 12 and 13 designate a plurality of graphical input stations for shared communication with a computer facility indicated at 14. The input stations include respective graphical input devices such as indicated at 16 in FIG. 2, and respective raster type television display units such as indicated at 20. In general the graphical input devices may conform with any of those disclosed in my copending application Ser. No. 562,646 filed July 5, 1966, and the disclosure of said copending application is incorporated here by reference in its entirety.

Figures 2, 4:
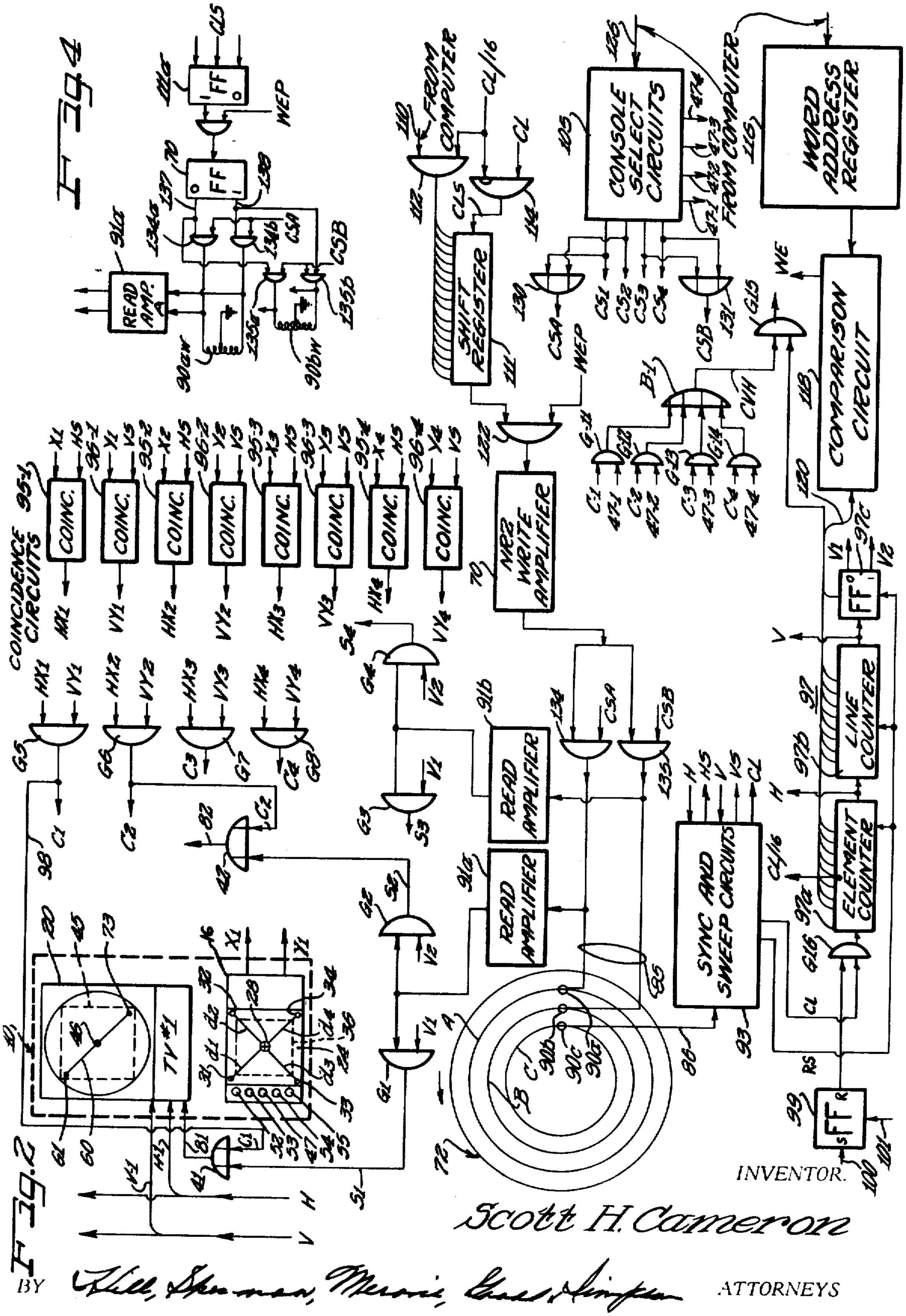
FIG. 2 is a circuit diagram showing exemplary details of various components of the system of FIG. 1.
FIG. 4 shows details of a preferred write amplifier circuit.

As indicated diagrammatically in FIG. 2, the graphical input device 16 may comprise a tablet 24 and a cooperating manually movable stylus element or pointer 28. Flexible cables are connected with the stylus as indicated at $d_1$, $d_2$, $d_3$ and $d_4$ so that movement of the stylus causes a corresponding movement of the cables. Preferably, the cables are led through respective eyelets 31–34 and then are led over pulleys or the like to the underside of the tablet 24. The eyelets 31–34 define a working area of the tablet which is indicated by the dash rectangle 36. As will hereafter be explained in greater detail the cables are drivingly connected so as to actuate transducer elements $E_x$ and $E_y$ in proportion to the components of movement of the stylus 28 with respect to the axes of a rectangular coordinate system. By way of example, the transducer $E_x$ may supply a voltage X1 which varies in accordance with the position of the stylus 28 with respect to a horizontal axis, and the transducer element $E_y$ may supply a voltage Y1 in accordance with the position of the stylus 28 with respect to a vertical axis. Similarly, the graphical input stations 11, 12 and 13 may provide voltages X2, Y2, X3, Y3 and X4, Y4 which are proportional to the instantaneous positions of the stylus elements of these stations in the same type of coordinate system.

As indicated in FIG. 1, the X and Y outputs of stations 10–13 are connected by means of a multiconductor cable 21 with a graphical data output circuits component 22. Preferably, component 22 includes means for generating coincidence pulses on output lines C1, C2, C3 and C4 which pulses occur at respective instants of time representative of the instantaneous positions of the stylus elements such as 28. The individual conductors C1–C4 are carried in a cable 24 and connect with respective mixer elements 41–44. The scanning of the rasters such as indicated at 45 for the display unit 20 in FIG. 2 is synchronized so that the coincidence pulse 46 on raster 45, for example, appears at a point substantially corresponding to the instantaneous location of the stylus 28 with respect to the working area 36. With this arrangement any point on the scanning raster 45 of the display unit 20 may be selected by observing the movement of the visually displayed coincidence pulse 46 on the raster as the stylus 28 is moved within the working area 36. When the coincidence or marker pulse 46 appears at precisely the desired location on the scanning raster 45, the operator may hold the stylus 28 at the corresponding location and transmit a suitable signal to the computer for example by depressing a button such as indicated at 47 which is physically adjacent the working area 36. For example, manual actuation of button 47 may result in a signal being transmitted to the computer 14 requesting service for station 10. Where readout of stylus position from the buffer component 50 to the computer is to be serial in nature (that is from one console at a time), the computer would then signal buffer component 50 to convert the coincidence signal on conductor C1 to a suitable form for transmission to the computer. The computer may, of course, signal the console or station 10 when it has received a valid reading of stylus position.

The mechanics of obtaining service from a central computer at each of a plurality of stations is not per se a part of the present invention, and need not be shown in detail herein since such circuitry is well understood in the art. For the purpose of an example which may be described briefly, readout of selected points from the respective consoles could be in parallel. In this case the actuation of the button 47, FIG. 2, would cause a readout of a stylus position from a register of buffer 50, FIG. 1, associated with the individual console, the registers of the respective consoles being updated during each scanning cycle in response to the respective coincidence pulses C1–C4.

As is well known in the art, other prearranged signals may be transmitted from the individual consoles to the computer which commands will have effects in accordance with the program stored in the computer. These signals might relate to the generation of various geometric configurations such as lines, arcs, polygons and the like which geometric figures would be specified by two or more points selected by the operation of stylus 28 and button 47, for example. Thus to generate a line on the display region as represented by raster 45, the end points of the desired line might first be indicated with the use of stylus 28 and button 47 and transmitted to the computer, after which a line generate command could be transmitted to the computer for example by means of an additional manually operated button such as indicated at 52. The means for signalling between a console and a computer to indicate any one of a multiplicity of prearranged graphical operations is known in the prior art and does not per se form part of the present invention. To explain a simple arrangement, coded signals produced by the buttons such as 47 and 52 could be connected with the computer by means of a multiple conductor cable to transmit a distinctive code or pattern of activated conductors for each button of each console. Simply for the purpose of illustration, the computer program might be such that depressing of button 52 would cause the computer 14 to transmit to the buffer 50 the information for generating a straight line between a previously selected pair of points. Button 53 might cause the computer to transmit to buffer 50 the information for generating an arc with a first selected point as the center of the arc, with a second selected point designating the counterclockwise limit of the arc, and with the third selected point together with the first defining a radial line on which the arc terminates. Button 54 might cause the computer 14 to transmit to the buffer 50 information for generating a polygon within the display region 45 with successive selected points sequentially designating the corners of the polygon in the clockwise sense.

As a further example, button 55 might signal the computer to cause the erasure of a figure such as a straight line designated by previously selected points. Other signals may be programmed for shifting figures, changing scale factors, rotating figures, producing mirror images and so on.

In accordance with the concepts of the present invention, the computer program generates display signals in response to commands from the individual consoles which signals are in the form of unitary weighted digital commands or strings of bits representing the intensity of illumination desired at successive individual points on the display raster 45 of a given display unit. This may most readily be explained by reference to a specific example. Suppose that the display region 45 of each display unit is to be divided into 256 horizontal rows of elemental points and that each row is to be made up of 256 uniformly spaced elemental points. If scanning of the raster 45 takes place by scanning a succession of horizontal lines, each being scanned from left to right as viewed in FIG. 2, then the computer would transmit a signal which would directly specify the desired light intensity at each of 256 time intervals during each horizontal scan of the display region 45. In this example, if the computer communicated with buffer 50, FIG. 1, by means of words of 16 bits in length, a first word of 1011011110101111 would represent directly the modulation to be supplied to the grid of the cathode ray tube associated with display unit 20, FIG. 2. Specifically, this word might relate to the sequence of light and dark regions as the cathode ray beam scanned the first 16 elemental points of the uppermost scanning line of the raster 45. With this word from the computer, the cathode ray beam would be on during scanning of the elemental point at the upper left corner of raster 45, would be off during scanning of the next succeeding elemental point, then would be on during scanning of two further points along the first horizontal scanning path, and so on.

By way of further specific illustration, suppose that a straight line is to be generated between the point at the upper left of raster 45 and a point at the lower right of the raster. The stylus 28 would first be moved to the upper left position near eyelet 31, FIG. 2, and the select button 47 would be actuated. If the successive vertical columns of elemental points of the raster 45 are designated from left to right by the numbers 000 to 377 (octal) and if the successive horizontal lines of such elemental points are designated (from top to bottom) with the numbers 000 to 377 (octal), then point 61 might be designated to the computer by an address word 000000 (octal). (The element or point in the second line from the top and in the third column from the left would be designated 0010028.) Similarly, point 73 selected at the lower right by positioning stylus 28 near eyelet 34 would have the address 377377 (octal).

The computer upon receiving the addresses of the two selected points and the command signal to generate a line (utilizing the last two selected points as end points) would select the successive elemental points of the scanning raster which should be energized to present the desired line which is indicated at 60 in FIG. 2.

The details of a suitable program for computing the desired points to be energized forms no part of the present invention. To give an example, the program might first provide for the computation of successive points along the desired line at uniform intervals *d*. For example, if the top line of elemental points of scanning raster 45, FIG.

2, is taken as the $x$-axis and the left hand vertical line of elemental points of the raster 45 is taken as the $y$-axis, and if the angle $\theta$ of line 60, FIG. 2, is measured counterclockwise from the $y$-axis, the point 61 would be at $x_0=000$ and $y_0=000$ and the next computed point would have coordinates $x_1=x_0+d \sin \theta$ and $y_1=y_0+d \cos \theta$ (considering the downward and rightward directions positive in the coordinate system). Similarly the next computed point would have the value $x_2=x_1+d \sin \theta$ and $y_2=y_1+d \cos \theta$. Such points would be computed until the number of computed points multiplied by the incremental value $d$ exceeded the length of line 60, FIG. 2. A preferred approach is to compute in the octal notation the values of $x_1$, $y_1$, $x_2$, $y_2$, etc., with greater precision than that corresponding to the resolution of elemental points of the raster 45, and then simply to round off the computed coordinate values to three places, giving the address of the closest raster element. For example, for a computer which does arithmetic to 36 binary places or twelve octal places, rounding off may be carried out by adding 000400000000 (octal) to each computed coordinate value, and then dropping all but the three most significant places. It is found that with $d=001$ (octal), the lines generated have a step appearance for $\theta$ near 0°, 90°, 180° and 270°. Thus it is presently preferred to use a value of $d$ of 004 (octal) giving a configuration closely simulating a dotted straight line between the points.

The computer may be equipped with a memory having a number of bits corresponding to the number of elemental points of the raster 45. Thus for the case where a line 60, FIG. 2, is to be generated, the initial specified point 61 would be transmitted to a memory position having the address 000000. Similarly, the computer would store a "one" indication at addresses 003003, 006006, 010010, 013013 . . . 377377. Readout from the computer memory is preferably at least a word at a time, and might begin with a word of unitary weighted display signals or string of bits based on the memory positions having addresses between 000000 and 000017. If there had been no previous information in the computer memory with respect to the elemental positions of the raster of the first console 10, then the computer might transmit to buffer 50 a word as follows (representing a string of bits): 1000000000000000. The computer might be programmed so as to next read out the word beginning at memory position 000020 (and extending to 000037). The second display signal transmitted to the buffer 50 would then be 0000000000000000. With this type of arrangement, the computer would begin updating the display promptly after receiving a command from the given console, and it would be apparent to the operator at the console that this command was in the process of being executed. It will be understood by those skilled in the art that with the type of program herein described present computers could supply the requisite information in response to a command with reasonable promptness.

Of course, programs will readily occur to those skilled in the art from the present disclosure for expeditiously carrying out the indicated operations. For many applications the computer can be programmed to store the coded commands from the consoles, rather than the computed unitary weighted display signals to save on computer storage facilities. In this case, the unitary weighted display signals for a given display could be computed from the stored coded command signals as to any group of raster lines to be updated. To give an example, suppose the computer had stored a line generation command for console No. 1 specifying end points 000000 and 377377, and that end points for a second line were then supplied to the computer, for example 001004 and 021004 (octal). The computer would then generate unitary weighted display signals such as 10000000 etc. for the line $y=000$, 00001000 etc. for the line $y=001$, 0001000 etc. for the line $y=003$, 00001000 etc. for the line $y=005$, and 0000001000 etc. for the line $y=006$. Using a $d$ value of 004, there would be no computed points in the lines $y=002$ and 004, for example.

The computer in calculating points for previously commanded configurations from stored coded instructions and in generating points for newly commanded configurations could compute and store points for one half a raster at a time, for example, to further reduce the amount of core memory required in generating display signals to update display memory 72.

Each group or word of display signals from the computer may be accompanied by the address of the first position of such group so as to facilitate the transfer of the group via write amplifier 70 and read and write coupling means 71 to the magnetic disk display refreshment means 72. Thus the first word above referred to would be accompanied by a word address signal 000000 and the second word or group of absolute signals above referred to would be accompanied by a word address signal of 000020, and so forth. To give a further example, the last absolute display word required to generate the line 60 would be 0000000000000001 and would have an address of 377360 (octal). With this string of bits recorded on the disk memory 72, the final end point indicated at 73 of the line 60 would have been generated.

Of course, if other pictorial configurations had been generated prior to the command for the line 60, the words representing the new information from the computer would include "ones" at any locations required to maintain the display of such previously generated pictorial configuration with the specific example just referred to.

As will hereinafter be described, in the specific embodiment of FIG. 2, it is preferred to utilize a NRZ mode of recording on the disk 72, and in this event the computer may update disk 72 a word at a time but in batches corresponding to one or more complete lines on the display raster 45. In this case, each line of core positions in the computer memory (corresponding to a horizontal line of raster 45) which receives new information during a computing cycle would be read out, for example as a sequence of 16 words with word addresses such as (for the first line) 000000, 000020, 00040 (octal), etc.

In accordance with the concepts of the present invention, each channel of the magnetic disk memory 72 contains at least one complete field of unitary weighted display signals, and the magnetic disk memory is operated at such a speed as to produce substantially persistent displays at each of the consoles 10–13. In FIG. 1, the display signals for at least one field are cyclically supplied via conductors S1, S2, S3 and S4 to one input of mixers 41–44, and the outputs of these mixers are coupled via conductors 81–84 to the intensity control electrodes of the respective display units such as indicated at 20, FIG. 2. The reference numeral 85 in FIG. 1 may be taken to represent a multiconductor cable or the like for transmitting display signals between components 71 and 72. The component 72 may also supply suitable synchronizing signals to the various other components so as to synchronize the scanning of the respective rasters such as 45 of the respective stations 10–13 and so as to synchronize the operation of components 22 and 50 with the scanning at the individual stations. A sync pulse output from component 72 is indicated at 86 in FIG. 1.

As described in my copending application Ser. No. 562,646, the signals such as X1 and Y1 may be generated directly in coded digital form for example with the use of digital shaft encoders. If the shaft encoders present a selected stylus position in the same octal form as previously described, the coincidence signals at lines C1, C2, C3 and C4 could be generated by a digital comparison of such values with a digital registration of instantaneous beam scanning position (in a counter, for example). Alternatively, the stations 10–13 could supply both digital and analog representations of values such as X1 and Y1, for example by utilizing both a digital shaft encoder and a potentiometer with respect to each axis in the graphical input devices of the type disclosed in said copending application Ser. No. 562,646. The analog output from the input devices such as indicated at 16 in FIG. 2 could be compared, for example, with horizontal and vertical sweep signals obtained from the display units such as 20 to provide coincidence signals for input to mixers 41–44.

While the foregoing discussion will apprise those skilled in the art of the general nature of the present invention, in compliance with the patent statutes certain presently preferred circuit details will now be referred to having specific reference to FIG. 2 of the drawings.

It will, of course, be understood that the specific details hereinafter referred to as well as those previously mentioned are given by way of example and not by way of limitation.

In FIG. 2, the magnetic disk display refreshment means 72 is indicated diagrammatically as having channels A, B and C which are being scanned by respective magnetic record-playback heads 90*a*, 90*b* and 90*c*. In the illustrated embodiment, channel A receives one field of display signals for television unit 20 of console 10 and one field of display signals for console 11. Similarly, channel B carries one field of display signals for console 12 and one field of display signals for console 13. The signal reproduced by head 900*a* is supplied to a read amplifier 91*a*, while the signal reproduced by head 90*a* is supplied to read amplifier 91*b*. The output of amplifier 91*a* is supplied to gates G1 and G2 which are alternately enabled by signals V1 and V2. The signal V1 is present as the head 90*a* scans the field of channel A which is transmitted as signal S2 to be displayed at console 11. Similarly, gates G3 and G4 are controlled by signals V1 and V2 so that the field of channel B to be displayed at console 12 is delivered through gate G3 as signal S3, and so that the other field of channel B is supplied through gate G4 as signal S4. If the disk 72 revolves at the rate of 30 revolutions per second, then each console will display its field pattern at a repetition rate of 30 times per second so that the displays will be substantially persistent.

The signals V1 and V2 may be obtained, for example, from the synchronizing and sweep circuits component 93 which is connected with the output of head 90*c* scanning channel C. The channel C may have suitable synchronizing signals recorded thereon. As one example (which is not the one specifically illustrated in FIG. 2), the channel C may have horizontal sync pulses recorded thereon. Component 93 could include a flip-flop receiving as an input the V pulses (for example derived from the horizontal sync pulses H) so as to supply at a set output the V1 pulses and at a reset output the V2 pulses, for example. Also in this example, the H and V pulses could be utilized within component 93 to generate a horizontal sweep waveform HS and a vertical sweep waveform VS of conventional saw-tooth waveform for use as inputs to coincidence circuits 95–1 through 95–4 and 96–1 through 96–4.

Continuing with the example of a horizontal sync pulse signal recorded on channel C, the horizontal sync pulses might be spaced at intervals equal to the channel length divided by 576. This would correspond to a scanning of 576 lines per revolution of the disk 72. There might be 288 horizontal sync pulses recorded on one-half of the channel C corresponding to the first field scanning interval V1, but only 256 horizontal sync pulses recorded on the first part of the second half of channel C corresponding to the interval during which the displays of consoles 11 and 13 were being scanned. The gap in the horizontal sync pulse train during the retrace interval for field V2 could be utilized for generating a reset pulse RS, for example. Alternatively the vertical sweep waveform VS could be utilized to generate reset pulses RS during each vertical retract interval and alternate ones of these reset pulses could be transmitted for example with the use of an AND gate controlled by signal V2.

If vertical synchronizing pulses were not recorded on channel C or on a separate channel, these could be derived from the horizontal sync pulses H with the use of a counter chain providing a division factor of 288.

Continuing with the example where the horizontal sync pulses are recorded on channel C of disk 72, a clock oscillator having a nominal output frequency of 92,160 pulses per revolution of disk 72 could be driven by the horizontal sync pulses reproduced from head 90*c* so as to provide clock rate pulses synchronized with the horizontal pulses and thus synchronized with rotation of disk 72. This number of clock pulses per drum revolution corresponds to a scanning rate of 320 elements per line (including horizontal retrace interval). The clock pulse rate would correspond to the scanning of 256 elements for each line of the display raster 45 of each console, 64 clock pulses taking place while the scanning beam was blanked out, for the specific example which has been discussed herein.

As a second example (which is the one shown in FIG. 2), the channel C of disk 72 may have clock rate signals recorded thereon so as to supply clock pulses at the rate of 92,160 pulses per drum revolution. In this case, the horizontal sync pulses H would be obtained by dividing the clock rate pulses by a factor of 320, and the vertical sync pulses V would be obtained by dividing the horizontal sync pulses H by a factor of 288. There could be a gap in the recorded clock pulses on the channel C corresponding to the vertical retrace interval of the fields for consoles 11 and 13 to provide the reset pulse RS.

With clock pulses recorded on channel C of disk 72, an element counter 97*a* of counter chain 97 may receive the reproduced signal from heat 90*c* and divide the pulse rate by 320 to provide the horizontal sync pulse rate H at its output. The output of counter 97*a* may be supplied to a line counter element 97*b* providing for division by a factor of 288 so as to provide an output V at the vertical sync pulse rate. Similarly, a flip-flop 97*c* may be connected to the pulse output of counter 97*b* so as to provide direct coupled outputs at the field rate which are designated V1 and V2. The square wave V1 is connected to gates G1 and G3, and the square wave V2 is connected to an input of gates G2 and G4 in the illustrated embodiment.

The sync outputs H and V from counter elements 97*a* and 97*b* are connected to the horizontal and vertical sweep generators of component 93 to provide sweep signals HS and VS, and are supplied to the horizontal and vertical sweep circuits of the display units of consoles 10–13 as indicated at H–1 and V–1 for the display unit 20 in FIG. 2.

FIG. 2 illustrates in detail a preferred way of obtaining the coincidence signals C1–C4. Specifically, for example, the X coordinate voltage X1 representing the position of stylus 28 with respect to the X axis is supplied as one input to a coincidence detector 95–1. The second input to the detector is the saw-tooth horizontal sweep waveform HS. Referring to coincidence detector 95–1, when the horizontal sweep waveform HS reaches a voltage value corresponding to X1, the coincidence detector emits a pulse HX1. Similarly coincidence detector 96–1 emits a pulse VY1 when the vertical sweep waveform VS reaches a voltage value corresponding to Y1. A series of gates G5–G8 are connected with the outputs of coincidence detectors 95–1 through 95–4 and 96–1 through 96–4 as indicated by the labeling of the respective input and output lines of these components. Thus, gate G5 responds to the coincidence of an output pulse HX1 from detector 95–1 and an output pulse VY1 from detector 96–1 to transmit an output pulse C1. A conductor is indicated at 98 leading from the output of gate G5 to one input of mixer 41 shown at the left in FIG. 2. Since the sweep of the television display unit 20 is synchronized with the sweep waveforms HS and VS, the pulse C1 at the output of gate G5 will occur at a point on raster 45 such as indicated at 46 substantially corresponding to the position of the cross hairs of stylus 28 with respect to the working area 36 of input device 16, FIG. 2. An example of an amplitude comparison circuit which responds to coincidence between a reference voltage and an input waveform only during the positive-going portions of the input waveform is given in Section 9–11 of the text, Waveforms, edited by Chance et al., McGraw-Hill Book Company, 1949. With this type of amplitude coincidence detection, a coincidence pulse such as C1 will occur only during the active scanning of raster 45 and not during the retrace intervals. There will be a "0" signal on the A and B channels of disk 72 during horizontal and vertical retrace intervals, so that a beam blanking signal will be supplied by mixers 41–44 during retrace intervals.

The coincidence pulses C1–C4 are shown as being supplied to respective gates G11–G14 at the lower center of FIG. 2. Each of gates G1 through G14 is a logical "AND" type gate. The gates G11–G14 are controlled respectively by console select signals supplied to conductors 47–1 through 47–4.

As one example, it could be visualized that the signals such as 47–1 are true when the corresponding select button 47 is actuated. For example, if button 47 were actuated at console No. 1, this actuation might lock out or prevent actuation of the buttons 47 of the other consoles. In his example, with actuation of button 47 of console No. 1, conductor 47–1 would become true, and a pulse would be transmitted by gate G11 in response to the next coincidence signal C1. The transmitted pulse from gate G11 would be transmitteed by the logical OR gate B1 to supply an output pulse CVH. In the example under discussion, the signal CVH would interrupt the supply of clock pulses to the counter elements **97*a*–97*c* so that the count registered in the counter elements would identify the location of stylus 28 of console No. 1. Signal CVH would also enable the gates represented by symbol G15 at the lower right of FIG. 2 so that the count registered in the counter components 97*a*–97*c* would be read out in parallel, for example to a suitable buffer or to the computer 14. It will be noted that the maximum element count to be transferred is 377 (octal) and that the maximum line count to be transferred is 377 (octal). These numbers can be expressed from the condition of the first eight stages of counters 97*a* and 97*b*, and the field (whether related to an odd numbered station or an even numbered station) can be identified from the output of flip-flop 97*c*. The parallel readout from the counter might be to a register of the buffer component 50 of FIG. 1, for example, in which case the counter could be conveniently reset at the time of the next reset pulse RS which would also serve to reopen the gate G16 controlling the clock line CL to counter 97*a*. (This clock control gate G16 controlling the clock pulse input to counter 97*a* could be controlled by a flip-flop 99 which would be set by the pulse CVH on line 100 to close the gate and which would be reset by the pulse RS on line 101 to reopen the gate.) Where the output of the gate circuits G15 is supplied to a register of buffer 50, FIG. 1, there could be one register in buffer 50 for each console, and signals 47–1 to 47–4 would serve to route the output of gate G15 to the register associated with the active console. The computer would then read out the information from such registers in buffer 50 in a serial mode and at a rate less than the clock rate of the video system. Of course, it would be theoretically possible for the computer to read the selected point address directly from counters 97*a*–97*c*, in which case the computer would reset the flip-flop 99 controlling the gate G16 in the input line to counter 97*a* rather than using the reset pulse RS as mentioned previously. For the sake of an example which is capable of brief description, it might be assumed that the button 47 need only be held depressed for a certain definite time interval to insure that the computer would have received the selected point information. The button 47 would then be released to enable other consoles to communicate selected points to the computer. Of course, more sophisticated circuitry will occur to those skilled in the art if a greater investment in hardware is justified. For the example just given, flip-flop 99 would have its set input 100 connected with line CVH so that gate G16 would be closed to interrupt clock pulses upon the occurrence of a selected coincidence signal. In this example also reset line 101 would be connected with conductor RS where the output of counters 97*a*–97*c* is immediately transferred to a register of buffer 50. Otherwise, the reset line 101 could be controlled from the computer component 14 after the computer had received a valid address for the selected point. Preferably, the computer signal would enable a gate having a second input from conductor RS, so that clock pulses to the counter 97*a*** would begin immediately after the occurrence of a reset pulse RS.

As a second example which is presently preferred, the gate G16 would be maintained open during normal operation of the system. In this case, the instantaneous count of the counter components **97*a*–97*c* would be transferred via gate circuits G15 to a register of buffer 50 associated with the active console. Here again it may be assumed that when the button 47 of one console is actuated, there is a solenoid operated stop pin or the like which is actuated to prevent operation of the buttons 47 of the other consoles. Actuation of the button 47 of console No. 1, for example, would provide a true signal on conductor 47–1 to enable gate G11. It will be understood, of course, that the output of gate G11, for example, may enable an individual set of gates receiving the output of counter elements 97*a*–97*c* in place of the common buffer B1 and common gate G15, and that the individual gating circuits would then lead to individual registers of buffer component 50. That is, the output of counters 97*a*–97*c* would lead to four individual gating circuits one controlled by each of the gates G11 through G14**. The output of the individual gating circuits would go to individual registers corresponding to the respective consoles.

For either example, if the stylus 28 has its cross-hairs at the approximate center of the working area 36, the readout from counters **97*a* and 97*b* might each be 177 (octal). For console No. 1, flip-flop 97*c*** would be in the "reset" or reset condition.

For the sake of a more general example, a console select circuits component 105 has been indicated supplying outputs 47–1 through 47–4. With this arrangement, it might be visualized that depressing the button 47 of a given console would signal the computer that service was requested. The computer would then answer by activating the corresponding line 47–1 through 47–4 until a proper readout of the selected point had been obtained. The computer when answering a call for service as one example might enable a gate controlling line 100 of flip-flop 99 so that the next coincidence pulse such as C1 would set flip-flop 99 and interrupt the supply of clock pulses to counter **97*a*. The computer could then readout the contents of counter 97*a*–97*c* in any desired mode, for example reading the content of the counter directly (bypassing gate G15**).

Alternatively (as implied by the showing of FIG. 2), utilizing outputs 47–1 through 47–4 of component 105, the instantaneous output of gate G15 could be routed to one of a plurality of registers of buffer component 50, for example under the control of the conductors 47–1 through 47–4 as previously mentioned. In this last case gate G16 could remain open during normal operation of the system.

It will be appreciated that either the counter elements **97*a*–97*c* must continue cycling in synchronization with the disk 72 to supply the horizontal and vertical pulses H and V, or else the horizontal and vertical pulses should be recorded on the disk 72 or otherwise be made available to the display units of the respective consoles. In the presently preferred mode of operation, the counters 97*a*–97*c*** continue to operate and gate G16 remains open during normal operation of the system.

As described previously herein, the computer 14, FIG. 1, in response to actuation of buttons such as 52–55 preferably generates words of (unitary weighted) display signals and transmits the same to the buffer 50 for the purpose of updating one or more complete lines of a display control field on the magnetic disk 72. For the sake of a concrete example, it may be assumed that the word from the computer will have 16 bits or unitary weighted pulse positions, and that the word will be identified by means of the address of the first bit of the word. Using this example in FIG. 2, the conductor 110 may represent a 16 conductor cable for supplying the respective bits of a word to a 16 place shift register 111 under the control of AND gate circuitry 112. For example, every sixteenth clock pulse may be supplied to the AND gate circuitry 112 from a suitable counter stage of the element counter 97*a*. Where the element counter consists of a series of scale of two counter states, the desired pulse rate would be obtained at the carry output of the fourth stage. Thus, every sixteenth clock pulse would cause the transfer of a word to shift register 111. Thereafter exclusive-OR gate 114 would provide a series of 15 shift pulses to shift successive bits of the word to the last or output stage of the shift register. In the illustrated embodiment, the computer makes a word available in synchronism with the rotation of the disk 72 so that the word becomes available at the time when the corresponding word position on the magnetic disk 72 arrives at the recording head 90*a* or 90*b*. Thus the first bit of the computer becomes available in the shift register 111 at the time when the corresponding bit position on the magnetic disk 72 is in recording position. In the illustrated embodiment, a word address register 116 is shown which receives the address of the first bit position being transferred to the register 111. A comparison circuit 118 receives the outputs of counters 97*a*, 97*b* and 97*c* via a 17 conductor cable 120 and emits a pulse WE at a time when the counter chain generically designated by reference numeral 97 reaches a condition corresponding to the word address in register 116. The pulse WE will occur at the same instant of time as one of the pulses CL/16 so that the last bit position of shift register 111 will be read into the NRZ (nonreturn to zero) write amplifier 70 through AND gate 122 virtually simultaneously with the transfer of the word into the register 111. Of course, there will be an extremely small time delay between pulse CL/16 and pulse WE to allow for settling of any transient in shift register 111 before readout to the amplifier 70. By way of example, the comparison circuit 118 may include a monostable circuit responsive to the coincidence pulse (representing equality between the input at 120 and the input from 116) to generate an enabling pulse WEP having a duration of substantially 16 clock pulse intervals so that gate 122 remains enabled during the reading of the entire word from shift register 111. Alternatively, of course, the coincidence signal WE could be used to gate 16 clock pulses to the control input WEP of gate 122. These enabling clock pulses triggered by WE could be slightly delayed relative to pulse CL/16 and pulses CLS from gate 114 to allow for transient in the shift register 111. For example, pulse WE could trigger a 16-stage ring counter which would then respond to clock pulses to step through 16 positions and return to its initial condition in readiness for a further WE pulse. As an example, the clock pulses supplied to this ring counter could be delayed for example 10% of a clock pulse interval and the coincidence pulse WE could be delayed relative to CL/16. Such timing adjustments are well within the scope of those skilled in the art. Before completion of the transfer of the first word to the disk 72, the computer could prepare a second word for transfer and supply the address of the first bit thereof to register 116. Then, in response to the occurrence of the next pulse CL/16, the new word would be transferred into the shift register 111 and the reading cycle repeated. In this way, one or more complete lines of display signals may be rapidly transferred to the disk 72.

In the illustrated embodiments, the computer is indicated as supplying information via conductor 126 to console select circuits component 105. For example, the computer may supply a coded word designating the console display being updated and the circuits 105 may include a matrix for decoding this word and activating selectively output lines CS1 through CS4 indicating which of the consoles 10–13 is being updated. The signals CS1 through CS4 might activate indicators at the respective consoles advising the operator that the associated display channel was being updated. In the illustrated embodiment the CS1 through CS4 signals are utilized to provide an output CSA from OR circuit 130 and a CSB signal from OR circuit 131 to indicate whether channel A or B is to be updated. These signals control respective AND circuits 134 and 135 at the output of the write amplifier 70.

FIG. 4 shows the NRZ write amplifier component as a bistable circuit having one output 137 controlling gates 134*a* and 135*a* and a second output 138 controlling gates 134*b* and 135*b*. The gates 134*a* and 134*b* would be represented by gate 134 in FIG. 2 and gates 135*a* and 135*b* in FIG. 4 would correspond to gate 135 in FIG. 2.

It will be observed that with the illustrated circuit, the same magnetic head winding such as the winding 90*aw* of head 90*a* and winding 90*bw* of head 90*b* is utilized for the write and read operation as well as for the erase operation. Erasure would be essentially by rerecording complete lines after altering the memory in the computer to omit "ones" at the points to be erased.

It is preferable to have the clock track C provided with an NRZ type recorded waveform with circuits component 93 provided with a suitable differentiating circuit and with one circuit where the positive differentiated pulses are transmitted and with another circuit where the differentiated signal is inverted and then the positive pulses transmitted and combined with the positive pulses of the first circuit to provide a train of clock pulses of the same polarity. The read amplifiers 91*a* and 91*b* would be provided with suitable corresponding circuitry for transmitting positive pulses, for example, to gates G1 through G4 in response to each change in polarity of magnetization on the channels A and B.

In the embodiment of FIG. 2, the mixers 41–44 transmit the respective display signals in the form of trains of positive pulses of predetermined amplitude. The absence of a pulse from the output of a mixer signifies an off condition of the corresponding cathode ray beam, while the presence of a pulse of such predetermined amplitude results in a spot of medium intensity at the corresponding elemental point of the display raster. The coincidence pulses C1–C4 are of a substantially greater positive amplitude than the predetermined amplitude of the display signal pulses, so that a coincidence pulse is transmitted by the mixing circuits 41–44 as a pulse of a substantially higher amplitude and results in a distinctive marker spot such as 46 of substantially greater intensity and of greater apparent area.

The mixers 41–44 may take the form of OR circuits such as the one described at pages 394 and 395 of the book "Pulse and Digital Circuits" by Millman and Taub, 1956. In this circuit the diodes would be poled for poled for positive input pulses and the output pulse would have an amplitude equal to the amplitude of the largest input pulse. The pulses may be inverted in polarity and/or amplified to meet the above requirements or to adapt the circuit to various makes of conventional broadcast television receiver sets 20. In the illustrated embodiment the outputs of the mixers 41–44 may be connected to the outputs of the second detectors of the television receivers.

An alternative would be to transmit the display and coincidence pulse signals at the output of each of the mixers 41–44 as amplitude modulation of a radio frequency carrier corresponding to an otherwise unused channel (for example channel 6) of the television broadcast spectrum. Such a signal could be coupled to the antenna input terminals of my conventional television receiver 20, for example by means of a suitable twin lead transmission line. If desired horizontal and vertical sync signals could be included in the transmitted signal coupled to the antenna input terminals of the set 20 so as to supply a conventional composite television signal essentially corresponding to the usual broadcast television signal.

Figures 3A, 3B:
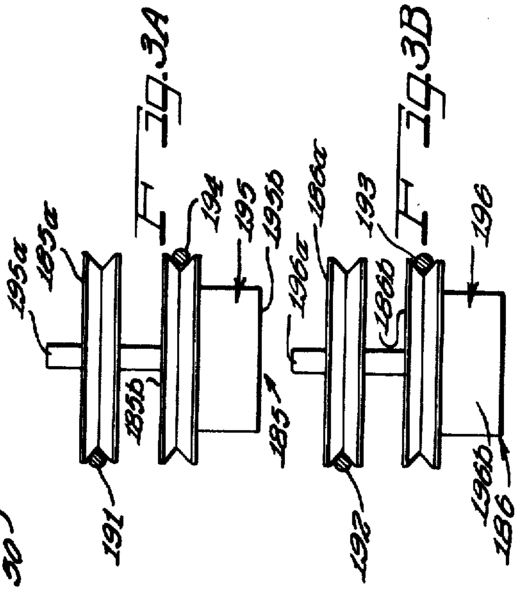
FIG. 3 is a somewhat diagrammatic bottom plan view showing further details of a preferred graphical input device and FIGS. 3A and 3B are elevational views diagrammatically showing the transducer assemblies of FIG. 3.
Figure 3:
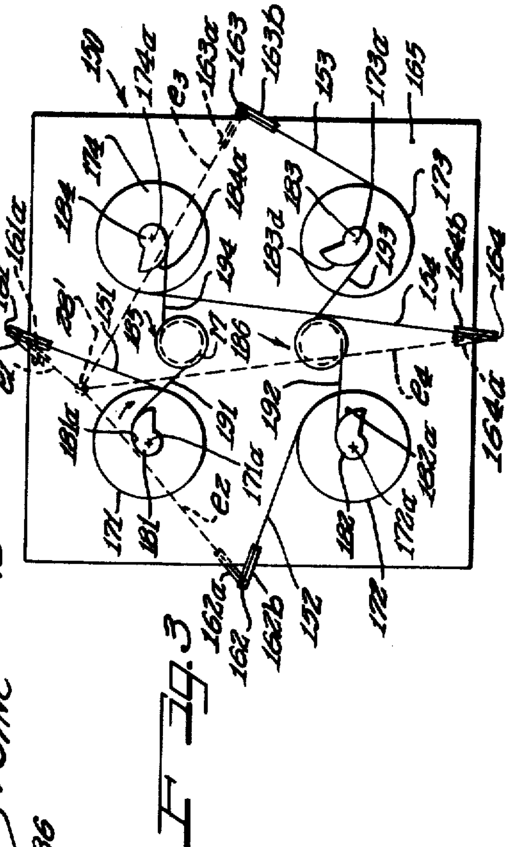

FIG. 3 illustrates a presently preferred graphical input device generally designated by the reference numeral 150. The device comprises a stylus or indicator 28′ corresponding to the stylus 28 of FIG. 2 which is preferably of a self-supporting configuration capable of maintaining an upright orientation and of remaining fixed at any point within the working region after being released by the operator. The stylus is connected with flexible nonstretchable cables 151–154 corresponding to the cables $d_1$ through $d_4$ of FIG. 2. The lengths of the respective cables 151–154 from respective fixed reference points 161–164 to the center of stylus 28′ are designated by the symbols $e_1$, $e_2$, $e_3$ and $e_4$, respectively. As in the embodiment of FIG. 2, movement of the stylus relative to the respective reference points results in a corresponding movement of the cables 151–154. The stylus may be of a rigid transparent material such as Lucite with cross hairs ruled thereon as indicated for the stylus 28 in FIG. 2. For the embodiment of FIG. 3, the eyelets 31–34 of FIG. 2 may be omitted and instead pulleys **161*a*–164*a* and 161*b*–164*b* may guide the cables 151–154 from the stylus element 28′ to the underside of the tablet or support 165 which is the side viewed in FIG. 3. The pulleys 161*a*–164*a* and 161*b*–164*b* are preferably mounted for rotation on their central axes, and the pulleys 161*a*–164*a* are capable of swivelling or castering about respective vertical axes passing through reference points 161–164 to provide smooth guidance for the cables in all working positions of the stylus 28′.**

The respective cables 151–154 are connected with constant radius surfaces of pulleys 171–174 which are rotatable on axes **171*a*–174*a* and are secured for joint rotation with respective spiral cams 181–184. The cables 151–154 are suitably fixed to the constant radius surfaces of pulleys 171–174 so that rotation of the cams 181–184 will be in direct proportion to the movement of the cables 151–154 relative to the respective reference points. The nonlinear and preferably square law surfaces 181*a*–184*a* of cams 181–184 provide output displacements from the cams and for this purpose are coupled to respective transducer assemblies 185 and 186 by means of coupling cables 191–194. Thus, preferably, the displacement of cables 191–194 relative to suitable reference points is a function of the square of the displacement values $e_1$–$e_4$ of cables 151–154. By way of example, cable 191 may be secured to pulley 185*a* on shaft 195*a* of a transducer such as a potentiometer 195. The cable 194 may be secured to a pulley 185*b* fixed to the casing 195*b* of potentiometer 195. Similarly cable 192 may be fixed to pulley 186*a* on shaft 196*a* of transducer 196, while cable 193 may be secured to pulley 186*b* which is fixed to the casing 196*b* of potentiometer 196. Suitable watch motor type springs (not shown) are provided biasing shaft 195*a* of potentiometer 195 in the counterclockwise direction and biasing the casing 195 in the counterclockwise direction as viewed in FIG. 3 so as to maintain taut the cables 151, 154 and 191, 194. Similarly watch motor type springs (not shown) act on the shaft 196*a* and the casing 196*b* of potentiometer 196 so as to maintain the cables 152, 153 and 192, 193 in a taut condition for all positions of the stylus element 28′. The forces on the pair of first cable means 151 and 154 and on the pair of second cable means 152 and 153 are sufficiently balanced so that the stylus 28′ can be easily maintained in any position to which it is moved over the working region corresponding to region 36, FIG. 2, of support 165.**

By analogy with the reasoning given in my copending application Ser. No. 562,646, it will be observed that the following equations hold with respect to a rectangular coordinate system having its origin at the center of the working surface of support 165 and assigning points 161–164 coordinates $x_1=0$, $y_1=+1$; $x_2=+1$, $y_2=0$; $x_3=-1$, $y_3=0$; and $x_4=0$, $y_4=-1$ (a top view of FIG. 3 being visualized as having point 161 at the top, point 162 to the right, point 163 to the left and point 164 at the bottom):

$$e_1^2=(y-1)^2+x^2 \quad (1)$$

$$e_2^2=(x-1)^2+y^2 \quad (2)$$

$$e_3^2=(x+1)^2+y^2 \quad (3)$$

$$e_4^2=(y+1)^2+x^2 \quad (4)$$

Subtracting Equation 1 from 4 to eliminate $x^2$ and subtracting Equation 2 from 3 to eliminate $y^2$, and rearranging terms:

$$y=\frac{e_4^2-e_1^2}{4} \quad (5)$$

$$x=\frac{e_3^2-e_2^2}{4} \quad (6)$$

Thus the output resistance values of potentiometers 195 and 196 are linearly proportional to the $y$ and $x$ coordinate values, respectively, of stylus position. Digital shaft encoders may alternatively or additionally be provided for actuation by the differential rotation between shaft **195*a* and casing 195*b*, and between shaft 196*a* and casing 196*b*, respectively, so as to supply octal coded numbers for the $y$ and $x$ coordinates of stylus position exactly corresponding to the $y$ and $x$ octal coded address numbers of the associated marker position such as 46 on raster 45.**

Referring to FIG. 3, no effort has been made to correlate the angular positions of cams 181–184 with the indicated position of stylus 28′.

The following describes a procedure for designing cams of the type sketched in FIG. 3. As the cam 181, for example, is rotated in the direction indicated by the arrow in FIG. 3, the flexible string or cable 191 is caused to unwrap from the cam and cable 151 is wrapped on pulley 171. It is assumed the string 191 is maintained under tension by some means. If we measure the cam rotation by the variable $\phi$, $e_1=K_1\phi$. If the length of string 191 supplied to transducer 185 is designated by the variable $s$, our task is to design a cam such that $s=F(\phi)$ where $F(\phi)$ is some specified function. In this discussion we consider the special function $$s=\frac{K\phi^2}{2} \quad (7)$$

since it is of special interest to us (so that $s=K^1e_1^2$), but it should be clear that the general procedure could be applied to a wide range of functions.

The analysis is most readily conducted in a coordinate system fixed on the cam. In this coordinate system and visualizing cam 181 in top plan, the fixed reference point M moves in a counterclockwise sense along an arc of radius D, through an angle again measured by the variable $\phi$. The string 191 intersects the reference point M and is tangent to the cam surface **181*a*** at the point whose polar coordinates are denoted as $R(\phi)$ and $\Psi(\phi)$. The angle $\gamma$ is defined as $(\phi-\Psi)$, $\alpha$ is the angle between the tangent to the cam at $(R,\Psi)$ and the perpendicular to the radius at that point, and D is the distance from the axis of rotation of the cam and the point M.

For any cam the rate at which string is fed past point M as a function of cam rotation is given by $$\frac{ds}{d\phi}=R\cos\alpha \qquad (8)$$

In this case we know that if the cam is to behave as we require, i.e., as in Eq. 7, that $ds/d\phi$ must also be equal to the expression derived by differentiation of Eq. 7

$$\frac{ds}{d\phi}=K\phi \qquad (9)$$

Equating (8) and (9) we obtain $$K\phi=R\cos\alpha \qquad (10)$$

It may be easily shown that $$\operatorname{Tan}\alpha=R^1/R \qquad (11)$$

where $$R^1=\frac{\partial R}{\partial\Psi}$$

from which we obtain $$\cos\alpha=R/((R^1)^2+R^2)^{1/2} \qquad (12)$$

Eq. 12 may be substituted in Eq. 10 and solved to yield $$\phi=R^2/K((R^1)^2+R^2)^{1/2} \qquad (13)$$

Next we attempt to express $\gamma$ as a function of R and $R^1$. From the triangle of FIG. 3 it is clear that $$\gamma=\pi/2-\alpha-B \qquad (14)$$

From Eq. 11 we get $$\alpha=\tan^{-1}(R^1/R) \qquad (15)$$

and from the law of sines we may write $$\frac{\sin B}{R}=\frac{\sin(\alpha+\pi/2)}{D}=\frac{\cos\alpha}{D} \qquad (16)$$

Using Eq. 12 for $\cos\alpha$ and solving Eq. 16 for B we obtain $$B=\sin^{-1}(R^2/D((R^1)^2+R^2)^{1/2}) \qquad (17)$$

From (14), (15) and (17), we find $$\gamma=\pi/2-\tan^{-1}(R^1/R)-\sin^{-1}(R^2/D((R^1)^2+R^2)^{1/2}) \qquad (18)$$

But since $\phi=\gamma+\Psi$, we may use (18) and (10) to obtain $$\Psi+\pi/2=\tan^{-1}(R^1/R)+\sin^{-1}(R^2/D((R^1)^2+R^2)^{1/2})+R^2/K((R^1)^2+R^2)^{1/2} \qquad (19)$$

For notational convenience, let $R^1=P$ and differentiate both sides of Eq. 19 with respect to P to obtain $$O=R/(R^2+P^2)-PR^2/((R^2+P^2)(D^2(P^2+R^2)-R^4)^{1/2})-R^2P(R^2+P^2)^{-3/2}/K \qquad (20)$$

Multiplying (20) by $(R^2+P^2)/R$ and manipulating $$1=PR/(D^2(P^2+R^2)-R^4)^{1/2}+PR(P^2+R^2)^{-1/2}/K \qquad (21)$$

Solving (13) for $(P^2+R^2)^{1/2}$ and substituting in (21) we find $$1=\frac{P}{R}\left[\frac{K\phi}{(D^2-(K\phi)^2)^{1/2}}+\phi\right] \qquad (22)$$

For notational convenience we let $$\left[\frac{K\phi}{(D^2-(K\phi)^2)^{1/2}}+\phi\right]^{-1}=J(\phi) \qquad (23)$$

and rewrite (22) as $P=R\cdot J(\phi)$ (23)

Using (23) to eliminate P from (13) and solving for R gives $$R=K\phi\sqrt{1+(J(\phi))^2} \qquad (24)$$

Using (23), (24), and (13) in Eq. 19 we find $$\Psi=\tan^{-1}(J(\phi))+\sin^{-1}(K\phi/D)+\phi-\pi/2 \qquad (25)$$

Notice that Eqs. 24 and 25 express the cam coordinates as functions of the angle $\phi$. Thus we may establish a set of points along the cam by evaluating (24) and (25) for a sequence of values of $\phi$.

An important advantage of the graphical input device of FIG. 3 over one where the cams are rotated as a nonlinear function of cable extension (as in the fifth and sixth figures of my copending application Ser. No. 562,646), resides in the ease with which new cams can be substituted to provide for a change of scale or the like.

Where exact correspondence between stylus position and raster position is not required, the cams may be omitted and the transducers 185 and 186 driven directly from the cables.

SUMMARY OF OPERATION

In operation, the operator of each of the consoles of the terminal facility such as consoles 10–13, FIG. 1, may carry on shared communication with the central computer 14, FIG. 1, and the display at each console is continually maintained by means of the common magnetic disk memory 72, shown at the left in FIG. 2. The movement of each stylus such as 28, FIG. 2, produces a corresponding movement of the intensified marker spot 46 on the display unit raster 45, FIG. 2. Any desired point on the display raster 45 may be selected and communicated to the computer by manipulation of the stylus 28 and actuating suitable selector means (button 47 of console 10 for example) while the marker 46 is at a desired location on raster 45. To generate line 60, for example, on the raster 45, the computer is advised of the desired end points 61 and 73, and then given a line generate command for example by actuating button 52. The computer then calculates the points of raster 45 to be energized to represent the line and transmits successive words of unitary weighted display signals directly representing the desired configuration to shift register 111, FIG. 2. A 16-bit word is read bit by bit from the shift register 111 into non-return-to-zero type write amplifier 70 for recording on the requisite channel of disk memory 72 during 16 clock pulse intervals, after which a new word is entered into the shift register and read in a succeeding 16 clock pulse intervals, and so on until the new information has been fully transferred to the disk memory.

As indicated in FIG. 4, each display may be refreshed from magnetic head windings 90*aw* and 90*bw* of the magnetic disk memory except as interrupted by the actual receipt of write signals from the NRZ write amplifier 70.

FIG. 3 shows a preferred arrangement for electrically reading stylus position. The stylus indicated at 28' is coupled by flexible non-stretchable cables 151–154 to rotate spiral cams 181–184 in proportion to extension of cables 151–154 from respective reference points 161–164. Electromechanical transducer assemblies are differentially activated by pairs of cables 191, 194 and 192, 193 wrapped on square law cam surfaces 181*a*–184*a* so that their outputs are linear functions of the coordinates of stylus position in a rectangular coordinate system.

In the foregoing description the same symbol (such as C1) has been utilized to designate a given signal and the conductors along which the signal is transmitted.

It will be apparent that many modifications and variations may be effected without departing from the scope of the novel concepts of the present invention.

I claim as my invention:

1. A multistation graphical terminal system comprising a plurality of graphical input stations including respective visual display units having display regions for displaying pictorial images developed in part by a plurality of manually selected points, and respective manually operated graphical input devices including respective manually operated pointers each for selecting any elemental point in the corresponding one of said display regions, output means connected with said devices for transmitting successive signals representative of successive manually selected points on said display regions to a remote computer, input means operative to receive from the remote computer successive words of unitary weighted display control signals developed from a plurality of said position signals, a magnetic disk memory having respective circular tracks each with a capacity to control the light intensity at each elemental point of at least one of said display regions, and coupling means for coupling said circular tracks of said disk memory with the corresponding display units to normally repeatedly refresh the pictorial images on said display regions at a sufficient frame rate to provide the appearance of a substantially persistent display on each of said display regions, and connected with said input means for serially transmitting said successive words of unitary weighted display control signals therefrom to the corresponding track of said magnetic disk memory, said visual display units comprising broadcast television receiver sets.

2. A multistation graphical terminal system comprising:

a plurality of graphical input stations including respective visual display units having display regions for displaying pictorial images developed in part by a plurality of manually selected points, and respective manually operated graphical input devices including respective manually operated pointers each for selecting any elemental point in the corresponding one of said display regions, output means connected with said devices for transmitting successive position signals representative of successive manually selected points on said display regions to a remote computer, input means operative to receive from the remote computer display control signals representing a pictorial image developed by the computer from a plurality of said position signals, display refreshment means having respective channels for coupling with the respective visual display units and for coupling with said input means, the channels each having a capacity to control the light intensity at each elemental point of the corresponding one of said display regions, and coupling means for coupling each of said channels of said display refreshment means with the corresponding display unit to normally repeatedly refresh the pictorial images on said display regions at a sufficient frame rate to provide the appearance of a substantially persistent display on each of said display regions, and connected with said input means for transmitting display control signals therefrom to the corresponding channel of said display refreshment means, said visual display units having a scanning raster covering a raster area which occupies at least a substantial proportion of said display region and providing for scanning of each of a multiplicity of substantially uniformly arranged elemental points of said raster area occupying at least a square with about 256 elemental points along each side and including at least about $256^2$ elemental points in a predetermined scanning sequence, said display refreshment means comprising a rotary magnetic disk memory having on a single circular track thereof at least the image intensity information with respect to all of the elemental points of the raster area of at least one of said visual display units and arranged in a sequence in said track so as to be read out in the sequence corresponding to said predetermined scanning sequence of the raster area of the associated display unit, and said input means being operative to receive from the remote computer a group of display control signals simultaneously providing intensity information with respect to a series of said elemental points which are to be scanned in sequence in said predetermined scanning sequence.

3. The system of claim 2 with said magnetic disk memory having a single magnetic transducer head per track, and said coupling means providing for the updating of a portion only of one channel while continuing the display continuously at the other display units.

4. A multistation graphical terminal system comprising:

a plurality of graphical input stations including respective visual display units having display regions for displaying pictorial images developed in part by a plurality of manually selected points, and respective manually operated graphical input devices including respective manually operated pointers each for selecting any elemental point in the corresponding one of said display regions, output means connected with said devices for transmitting successive position signals representative of successive manually selected points on said display regions to a remote computer, input means operative to receive from the remote computer display control signals representing a pictorial image developed by the computer from a plurality of said position signals, display refreshment means having respective channels for coupling with the respective visual display units and for coupling with said input means, the channels each having a capacity to control the light intensity at each elemental point of the corresponding one of said display regions, and coupling means for coupling each of said channels of said display refreshment means with the correspond-display unit to normally repeatedly refresh the pictorial images on said display regions at a sufficient frame rate to provide the appearance of a substantially persistent display on each of said display regions, and connected with said input means for transmitting display control signals therefrom to the corresponding channel of said display refreshment means, said display refreshment means comprising a magnetic disk memory having a circular track thereon providing said channels for a plurality of visual display units, and said coupling means providing for the updating of one of said channels of said magnetic disk memory while simultaneously providing for the repeated refreshment of the other display units associated with other of the channels of said memory.

5. A multistation graphical terminal system comprising:

a plurality of graphical input stations including respective visual display units having display regions for displaying pictorial images developed in part by a plurality of manually selected points, and respective manually operated graphical input devices including respective manually operated pointers each for selecting any elemental point in the corresponding one of said display regions, output means connected with said devices for transmitting successive position signals representative of successive manually selected points on said display regions to a remote computer, input means operative to receive from the remote computer display control signals representing a pictorial image developed by the computer from a plurality of said position signals, display refreshment means having respective channels for coupling with the respective visual display units and for coupling with said input means, the channels each having a capacity to control the light intensity at each elemental point of the corresponding one of said display regions, and coupling means for coupling each of said channels of said display refreshment means with the corresponding display unit to normally repeatedly refresh the pictorial images on said display regions at a sufficient frame rate to provide the appearance of a substantially persistent display on each of said display regions, and connected with said input means for transmitting display control signals therefrom to the corresponding channel of said display refreshment means, said manually operated pointers each being movable over a working region remote from the corresponding display region and having its instantaneous position represented by a marker displayed on the associated display region, and said output means comprising electromechanical transducers mechanically coupled to said pointers for generating electric signals uniquely defining the positions of said pointers with respect to the associated working regions, said output means comprising nonlinear motion transmission means each having a linear surface mechanically coupled to one of the pointers and a nonlinear surface coupled to one of the transducers for converting linear movement of the pointers into nonlinear movement of the transducers.

6. The system of claim 5 with said motion transmission means comprising cams with square law varying surfaces coupled to said transducers and constant radius surfaces coupled to said pointers.

7. The system of claim 6 with said transducers comprising rotary motion digital encoders coupled with said cams so as to provide a coded digital output in accordance with the positions of said pointers.

8. A multistation graphical terminal system comprising:

a plurality of graphical input stations including respective visual display units having display regions for displaying pictorial images developed in part by a plurality of manually selected points, and respective manually operated graphical input devices including respective manually operated pointers each for selecting any elemental point in the corresponding one of said display regions, output means connected with said devices for transmitting successive signals representative of successive manually selected points on said display regions to a remote computer, input means operative to receive from the remote computer successive words of unitary weighted display control signals developed from a plurality of said position signals, a magnetic memory having respective tracks each with a capacity to control the light intensity at each elemental point of at least one of said display regions, said visual display units having scanning control means for scanning the successive elemental points of the display region cyclically and in a predetermined order corresponding to the order in which signals with respect to the elemental points are recorded along the length of the track on said magnetic memory, and coupling means for coupling said tracks of said magnetic memory with the corresponding display units for transmitting from the respective tracks trains of signals synchronized with the scanning of the corresponding elemental points of the respective display regions to normally repeatedly refresh the pictorial images on the display regions at a sufficient frame rate to provide the appearance of a substantially persistent display on each of said display regions.

9. The terminal system of claim 8 with said manually operated graphical input devices generating voltage signals in proportion to the displacement of the manually operated pointers with respect to predetermined axes in a coordinate system corresponding to the coordinate system in which the respective display regions are scanned, means for generating scanning signals in synchronization with the scanning of the visual display units so that the coincidence of the amplitude levels of the scanning signals and the voltage signals from the graphical input devices occur at the scanning of corresponding elemental points of the respective display regions, and means for generating a pulse signal in response to such coincidence and for directly superimposing such pulse signal onto the corresponding output from the corresponding track of the magnetic memory so that a marker of increased intensity appears on the respective display regions corresponding to the respective instantaneous positions of the associated manually operated pointers.

10. A multistation graphical terminal system comprising:

a plurality of graphical input stations including respective visual display units having display regions for displaying pictorial images, each including successively scanned elemental points, and respective manually operated graphical input devices including respective manually operated pointers each for selecting any elemental point in the corresponding one of said display regions, output means connected with said devices for transmitting successive position signals representative of successive manually selected points on said display regions to a remote computer, input means operative to receive from the remote computer display control signals representing a pictorial image developed by the computer from a plurality of said position signals, display refreshment means having respective channels for coupling with the respective visual display units and for coupling with said input means, the channels each having successive display control signals recorded at successive points therealong corresponding to the successive elemental points which are sequentially scanned in the corresponding one of said display regions, and coupling means for coupling each of said channels of said display refreshment means with the corresponding display unit to supply a train of the display control signals from the channel in synchronism with the sequence of scanning of the elemental points of the associated display region thereby to normally repeatedly refresh the pictorial images on said display regions.

11. The terminal system of claim 10 with said manually operated graphical input devices generating position signals with respect to predetermined axes in a coordinate system corresponding to the coordinate system in which the respective display regions are scanned, means for generating scanning signals in synchronization with the scanning of the visual display units, and means for comparing the position signals and scanning signals with respect to each visual display unit and for transmitting a coincidence signal when each display region is being scanned at an elemental point corresponding to the instantaneous location of the associated manually operated pointer, and means for supplying each coincidence signal to the associated visual display unit for superposition on the pictorial image being displayed thereby.

12. A graphical terminal system for use with a remote computer comprising:

a graphical input station including a visual display unit having a display region for displaying pictorial images, said display region including scanning means for scanning successive elemental points of the display region in a predetermined order, and means for manually selecting any desired elemental point in the display region, output means connected with said station for transmitting position signals to the remote computer representative of the selected points on the display region, input means operative to receive from the remote computer display control signals directly corresponding to a pictorial image to be generated on the display region by said scanning means, display refreshment means having a channel for coupling with the visual display unit and for coupling with said input means, being operative to record at successive points along said channel successive display control signals with respect to the successive elemental points of the display unit which are sequentially scanned by said scanning means, and being operative to supply the successive display control signals from the channel at a rate corresponding to the scanning rate of the successive elemental points of the display region and in an order corresponding to the predetermined order of scanning of the elemental points of the display region, and coupling means for coupling the display control signals from the channel to the display unit thereby to normally generate the pictorial image on said display region.

References Cited

UNITED STATES PATENTS

| | | | |
|---|---|---|---|
| 3,307,156 | 2/1967 | Durr | 340—172.5 |
| 3,323,119 | 5/1967 | Barcomb et al. | 340—324 |
| 3,376,551 | 4/1968 | Armbruster | 340—172.5 |
| 3,399,401 | 8/1968 | Ellis et al. | 340—324 |
| 3,402,395 | 9/1968 | Culler et al. | 340—172.5 |

RAULFE B. ZACHE, Primary Examiner

U.S. Cl. X.R.

340—324